(12) United States Patent
Wafzig et al.

(10) Patent No.: US 6,599,216 B1
(45) Date of Patent: Jul. 29, 2003

(54) GEARBOX UNIT

(75) Inventors: Jürgen Wafzig, Eriskirch (DE); Martin Grumbach, Friedrichshafen (DE); Markus Hoher, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/070,546

(22) PCT Filed: Sep. 5, 2000

(86) PCT No.: PCT/EP00/08634

§ 371 (c)(1),
(2), (4) Date: Feb. 28, 2002

(87) PCT Pub. No.: WO01/19637

PCT Pub. Date: Mar. 22, 2001

(30) Foreign Application Priority Data

Sep. 11, 1999 (DE) .......................................... 199 43 623

(51) Int. Cl.$^7$ .............................................. F16H 37/02
(52) U.S. Cl. ...................................... 475/214; 180/248
(58) Field of Search ................................ 475/201, 214; 180/248, 251

(56) References Cited

U.S. PATENT DOCUMENTS

| | | | |
|---|---|---|---|
| 4,548,100 A | 10/1985 | Höhn | 74/689 |
| 4,836,322 A * | 6/1989 | Sakakiyama | 180/247 |
| 5,215,161 A * | 6/1993 | Kobayashi | 180/248 |
| 5,632,354 A | 5/1997 | Kashiwase et al. | 180/344 |
| 5,888,161 A | 3/1999 | McCarrick et al. | 475/43 |
| 6,019,695 A | 2/2000 | Kobayashi | 475/204 |
| 6,041,877 A | 3/2000 | Yamada et al. | 180/65.2 |
| 6,244,985 B1 | 6/2001 | Wafzig et al. | 476/42 |
| 6,480,778 B2 * | 11/2002 | Tanaka et al. | 701/69 |

FOREIGN PATENT DOCUMENTS

| | | | |
|---|---|---|---|
| DE | 29 48 194 | 6/1980 | F16H/37/06 |
| DE | 31 18 075 A1 | 11/1982 | F16H/37/02 |
| DE | 44 32 889 A1 | 3/1995 | B60K/17/04 |
| DE | 196 31 236 A1 | 2/1997 | F16H/37/02 |
| DE | 196 39 904 A1 | 5/1997 | B60K/17/06 |
| DE | 44 32 889 C2 | 7/1997 | B60K/17/04 |
| DE | 198 44 374 A1 | 3/2000 | F16H/61/02 |
| EP | 0 078 124 A1 | 5/1983 | F16H/37/08 |
| EP | 0 743 218 A2 | 11/1996 | B60K/17/346 |
| GB | 2 045 368 A | 10/1980 | B60K/17/04 |
| WO | 99/05433 | 2/1999 | F16H/15/38 |

* cited by examiner

*Primary Examiner*—Dirk Wright
(74) *Attorney, Agent, or Firm*—Davis & Bujold, P.L.L.C.

(57) ABSTRACT

The transmission unit, especially designed for a motor vehicle, possesses a housing with an input drive shaft with at least one output drive shaft and with an arrangement for the variation of the gear ratio whereby, within the housing a starting element is provided, which is connected to a stepless transmission which, in turn, is in connection with power split apparatus that possesses a first output drive shaft for the rear axle drive and a second output drive shaft, which is connected with a differential for a front axle drive.

28 Claims, 23 Drawing Sheets

GEARBOX UNIT

FIELD OF INVENTION

The present invention concerns a transmission unit, in particular for motor vehicles, with a housing, with an input drive shaft, with an output shaft and with a arrangement for changing the gear ratio between said two shafts, which arrangement exhibits a continuously variable, gear drive.

BACKGROUND OF THE INVENTION

Continuously variable gear drives (hereinafter "CVT") in the form of stepless transmissions or friction clutch drives are known in a multiplicity of variations. For instance, DE 198 44 374.9 of the Applicant describes a CVT drive which possesses a first V-pulley pair on an input drive shaft and a second V-pulley pair on an output drive shaft, whereby each V-pulley pair comprises a first pulley fixed in the axial direction and a second V-pulley which is slidable in an axial direction, otherwise designated respectively as a primary pulley and as a secondary pulley. Between the V-pulley pairs runs a stepless organ, namely a steel thrust belt. The displacement of the primary pulley or the secondary pulley is done by means of a pressure medium with an aid of an electronic control apparatus which, through electromagnetic positioning elements and hydraulic valves regulates the range of pressure of the positioning space of the primary pulley and the secondary pulley.

A friction disk transmission is, in an exemplary way, described in the WO 99/05433. This transmission possesses input and output disks, which are assembled pairwise to one another and the mutually facing, inner surface of each of these disks is toroidal in shape. The transmission has likewise, friction disks installed between the pairs of input disks and output disks. These friction disks stand in friction contact with the inner surfaces of both the input disks and similarly with the output disks and transfer the torque delivered to them from the input disks over to the output disk by friction-based contact. When this is done, the rotational speed of the friction disks lies just so much higher, the greater the separating distance is between their touching zones with the input disk and the axis of rotation. The rotational speed of the output disk, on the other hand, is just so much greater, the closer the touching zone between the friction disk and the output disk on the axis of rotation is, by means of pivoting the friction disks on this account, the speed of rotation of the output disk can be adjusted in a stepless manner as desired. For this purpose, the friction disks are mounted on a carrier which is controllable by means of a pivoting apparatus. The two input disks of the two transmission units are, in this case, so affixed as to turn with a torque shaft, while the two output disks of the two transmission units, which are in mirror image of one another and placed beside one another in the transmission, are placed on a common bushing, which is set to rotate on the torque shaft. The torque shaft is crossed by an input shaft, which is connected with a starting element of the motor vehicle, for instance, a torque converter or a wet starting clutch of the driving machine of the motor vehicle.

The U.S. Pat. No. 5,888,161 describes an automatic transmission for a motor vehicle, which exhibits a CVT transmission, the input shaft of which is connected with a starting element in the form of a hydrodynamic converter, and the output shaft of which is connected to an intermediate shaft. Between the hydrodynamic converter and the CVT-transmission, a planetary gear set is provided which, first, is connected to the input shaft and, second, connected to a countershaft. The countershaft runs on to a gear-pair, which is subordinate to the CVT and which holds to a constant transmission ratio. The gear-pair possesses a first output shaft for the rear axle drive as well as a second output drive shaft which the CVT transmission converts for the front axle drive.

In this way, a 4-wheel-drive is created by the usage of a CVT-transmission, in the case of which, the starting of the motor vehicle is carried out by a by-pass to a gear reduction package which is placed in the CVT transmission. In this way, upon starting, the necessary large starting torque is transmitted exclusively through a gear tooth connection to the axles and not through the CVT transmission. Further a gear up-shifts are likewise shifted at a fixed gear ratio, however, with the intervention of the CVT. The apportionment of the torque between the front axle and the rear axle remains in this arrangement in a fixed ratio to one another for all gear shift positions.

The EP-A-743 218 discloses a four-wheel drive for a motor vehicle with the use of a friction disk transmission. A planetary gear set, or a differential is coupled thereto, which allows an output shaft for the rear axle and an output shaft for the front axle of the motor vehicle. Along with this, in a controllable manner, a division of the torque between the rear axle and the front axle of the motor vehicle is made possible, whereby, the friction disk transmission possesses two transmission units, the torques of which, are transferred, respectively, by an corresponding output shaft. The resulting two shafts are independent of one another and stand in connection with one another only through the differential. The torque evolved by the first transmission unit is, in part, conducted through the differential of the forward axle and, in part, to the rear axle of the motor vehicle. The torque yielded by the second transmission unit is completely and without any intermediate shifting of the differential, conducted to the rear axle. In this way, a torque apportioning of about 25% is transmitted to the front axle and 75% to the rear axle, as is, in particular, of advantage for heavy trucks.

The friction disk transmission employed here requires, first, an increased expenditure for construction, since in this case two compressor apparatuses and two output torque devices are required for the friction disk transmission. Second, two bearings and an apparatus in order to adjust the gear ratio for the rear wheel axle to be in accord with the motor are necessary.

SUMMARY OF THE INVENTION

The purpose of the present invention is to create a transmission unit especially for a motor vehicle which, besides the stepless transmission, possesses a multiplicity of necessary components required in addition for the drive of a vehicle and which can be installed both as a transmission unit for the drive of an axle as well as a transmission unit for the drive of two axles, that is, a forward axle and a rear axle of a motor vehicle.

The transmission unit in accord with the invention possesses a housing, with one input drive shaft and with at least one output shaft, whereby, in the housing the following components are to be found:
  a starting element connected to the input shaft,
  a stepless transmission connected to the starting element,
  a transfer gear set connected to the stepless transmission, which possesses
  a first output drive shaft, which is connected to the rear axle, and a second output drive shaft which is connected to the front axle through a differential for front axle drive, whereby, at least one of the half-axles, between the differential and the forward axle drive and its corresponding front wheel, penetrates the housing between the starting element and the stepless transmission.

The stepless transmission can, in this matter, be a CVT or a friction disk transmission, whereby the latter has a type of construction, as has been described in the previously mentioned WO 99/05433, wherein the two transmission units are connected by means of a common output with the transfer drive, so that the construction expense and complexity for the friction disk transmission is made less than in the case of the friction disk transmission described in EP 0 743 218 which was also mentioned in the introduction.

The transfer gear set, according to the invention, is integrated into the housing and advantageously possesses a mid-differential for the splitting of the torque to the rear axle and to the front axle for the motor vehicles provided with this transmission unit, in so far as the transmission unit is to assure a 4-wheel drive of the vehicle. Just as well, it is also possible to so design the transfer gear set that the entire torque delivered from the stepless transmission to the transfer gear set is exclusively transferred to the rear axle of the vehicle by means of bypassing the connection between the transfer gear set and the front axle differential, so that the invented transmission unit is usable for the drive of the rear axle.

By the invented integration of a multiplicity of components in one single housing, not only is the need for installation space substantially reduced, but also, as has been mentioned before, the advantage is gained that the transmission unit can be employed as a standard transmission unit or a 4-wheel drive unit, whereby the manufacturing costs and the upkeep of the bearings are substantially reduced. The adjustment of the axle gear ratio is done between the transfer gear set and the stepless transmission. The design of the distribution of the torque permits adjustment for the torque respectively in the transfer gear set in accordance with the demands in the case of a 4-wheel drive.

BRIEF DESCRIPTION OF THE DRAWINGS

The invention will now be described, by way of example, with reference to the accompanying drawings in which.

DETAILED DESCRIPTION OF THE INVENTION

Figure 1:
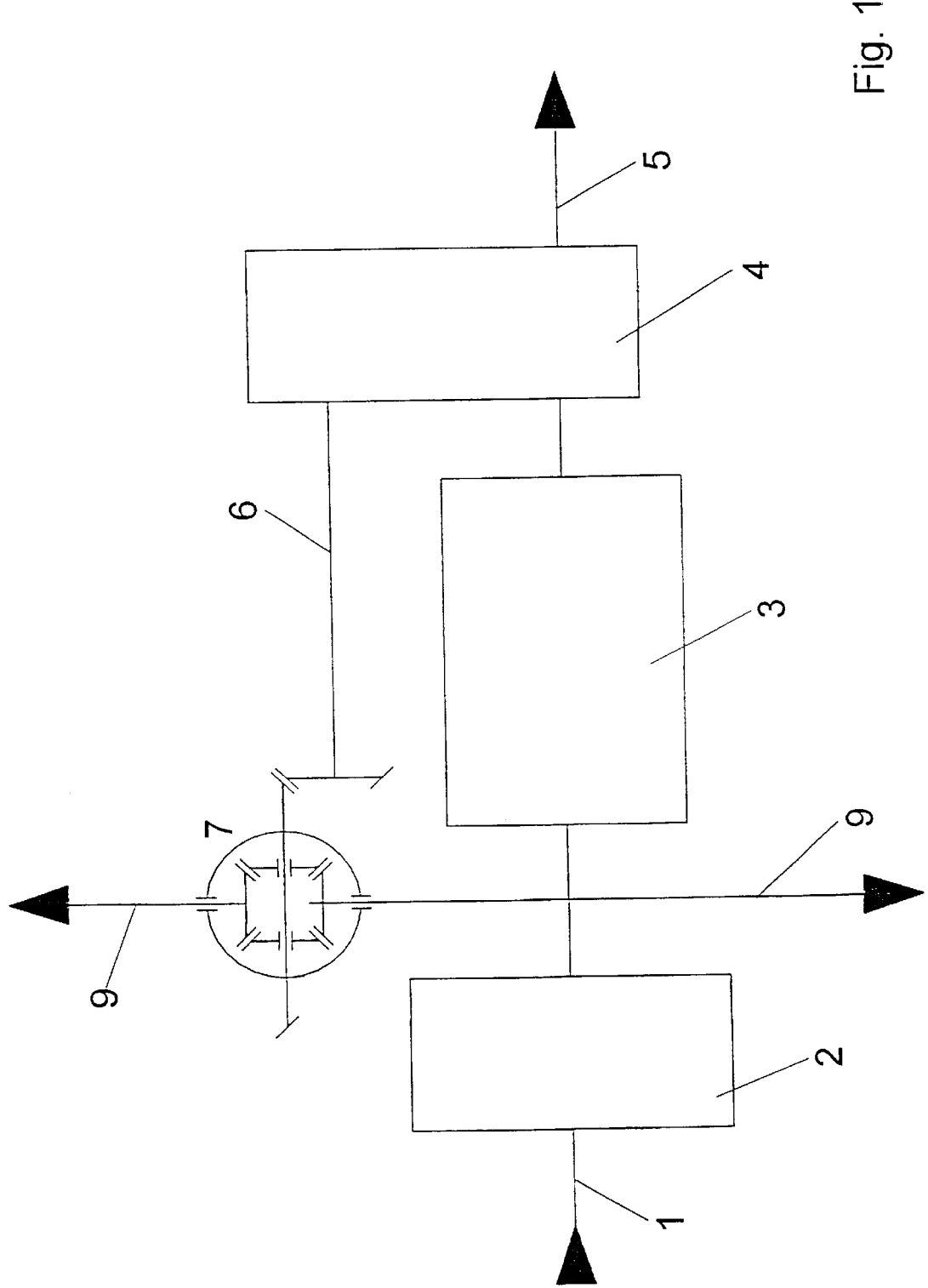
FIG. 1 is a component which is present in the transmission unit.

In FIG. 1 are shown the essential, integrated components brought together in one housing (not shown) for a transmission unit according to the invention. The components are "integrated", in that they are in this one housing. The reference number 1 denotes the input drive shaft connected with the engine of the motor vehicle; 2 designates the starting element connected to the input drive shaft in which the oil supply is integrated. The reference number 3 applies to a stepless transmission, which can be either a friction disk transmission or a CVT. The number 4 refers to transfer gear set which is connected with the stepless transmission. Transfer gear set 4 connects with a first output drive shaft for the rear axle drive of the motor vehicle and also connects with a second output drive shaft 6 which, through a differential 7, is in connection with a front axle drive. From differential 7 extend, in the conventional manner, two half-axles 9 to the two front wheels of the motor vehicle.

The transmission unit, according to the invention as it is sketched in FIG. 1, characterizes itself in an output drive for the rear axle, an output drive for the front axle, a mid-differential for the momentary division of power to the rear, axle and front axle, a front axle differential for the momentary division of power to the left wheel and the right wheel, a stepless transmission in the form of a CVT or a friction disk transmission with or without power splitting, starting element which can be a starting clutch, an integrated starting clutch, or a torque converter, or even a geared neutral transmission integrated into the stepless transmission, which replaces the said starting element.

Figure 2:
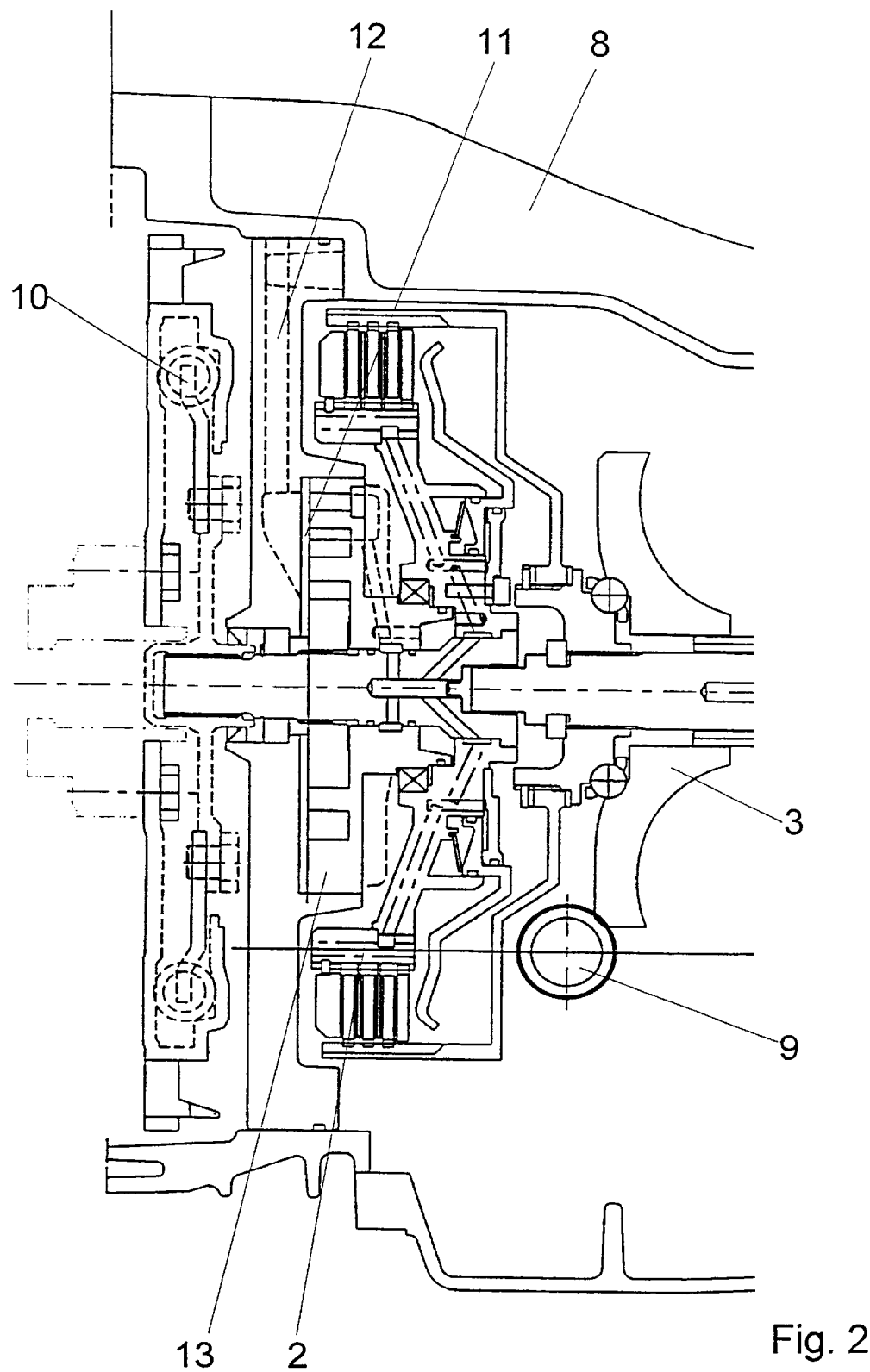
FIG. 2 is a partial section through that end of a transmission unit of a motor vehicle proximal to an invented transmission unit with the essential components.

FIG. 2 shows, a part of a concrete illustration of a transmission unit according to the invention whereby, in a housing 8 a starting element 2 is provided, which incorporates an oil supply unit 11, a motor-side oil feed apparatus, especially in the form of a channeled plate and a transmission-side oil pump 13. A torsion damper, located motor-side, is designated by 10 and serves for vibration damping.

FIG. 2 further illustrates that, at least one of the two half-axles 9 which connect the front axle differential with the front wheels, runs between the starting element 2 and the stepless transmission 3 which, in this illustrated case, is designed as a friction disk transmission, in order that collisions with the individual components of the transmission unit are avoided. In the case of the transmission schematics presented in the FIGS. 3 to 22, the same parts are designated with the same numbers, whereby in all of these embodiment examples, as a stepless transmission, a friction disk transmission 3 has been selected.

Figure 3:
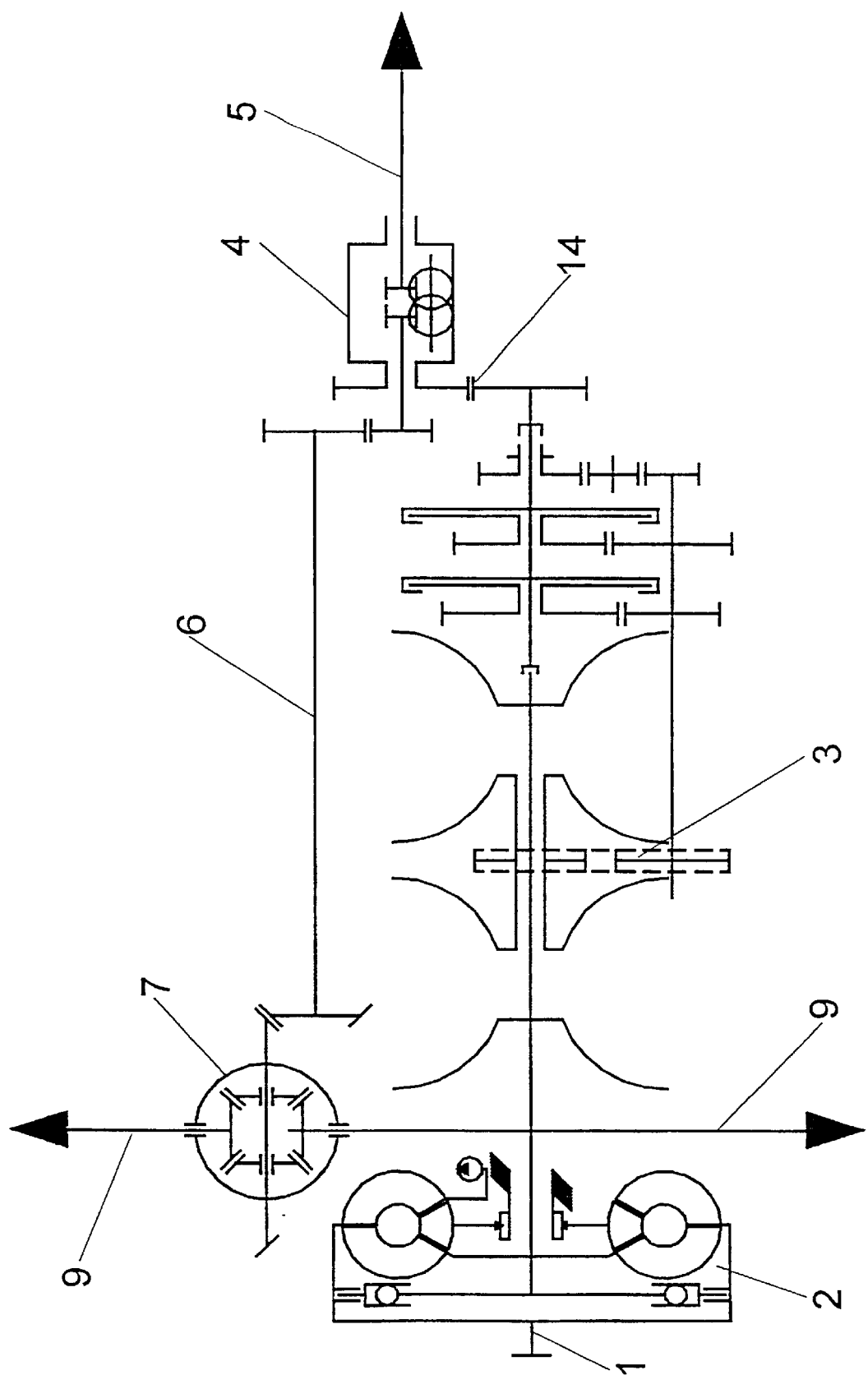
FIG. 3 to FIG. 23 are various embodiment forms of invented transmission units in schematic presentations.

FIG. 3 shows that the invented transmission unit (whereby in no case is the housing 8 illustrated) is provided with a starting element 2 in the form of a hydrodynamic converter, wherein the transmission unit is designed as a two-mode transmission without power split device. Reference No. 14 refers to a gear pair for the adjustment of the final gear ratio, which is carried out between the stepless transmission 3 and the transfer gear 4.

Figure 4:
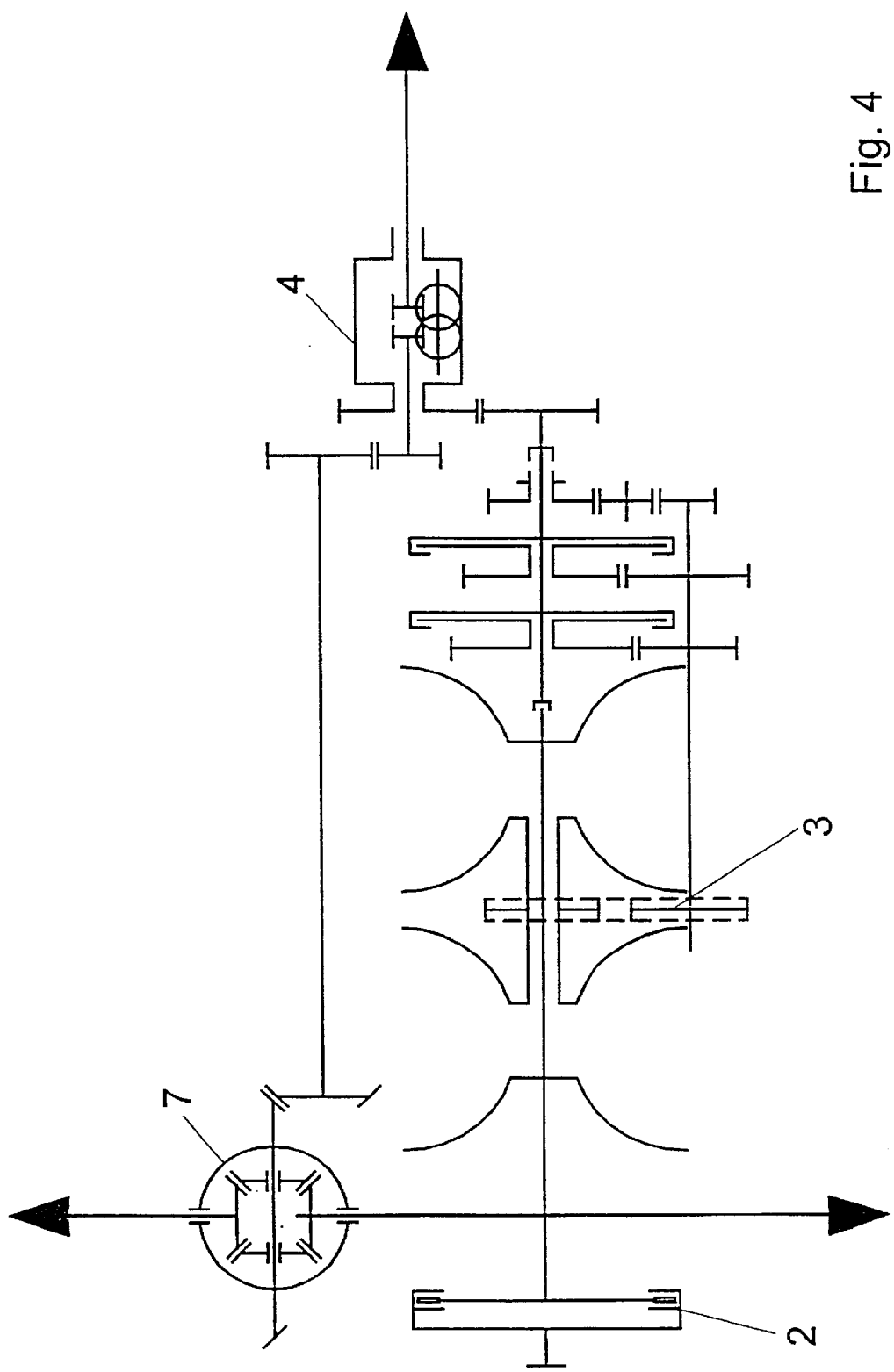

FIG. 4 shows a two-mode transmission unit without a power-split device wherein the starting element 2 is a starting clutch.

Figure 5:
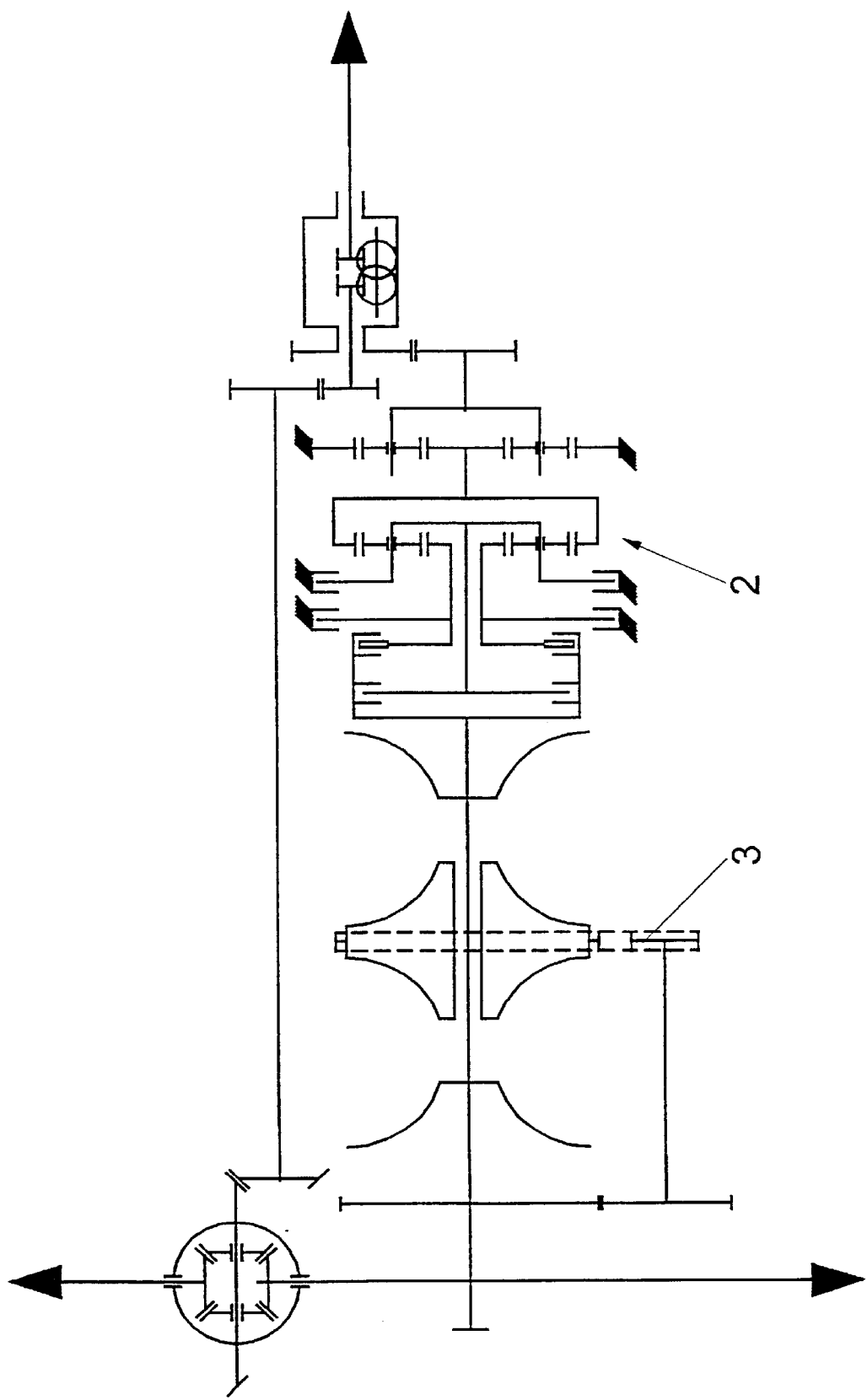

FIG. 5 shows a two-mode transmission unit without a power split device wherein the starting element is an integrated starting clutch, which is equipped with two individual planetary gear sets.

Figure 6:
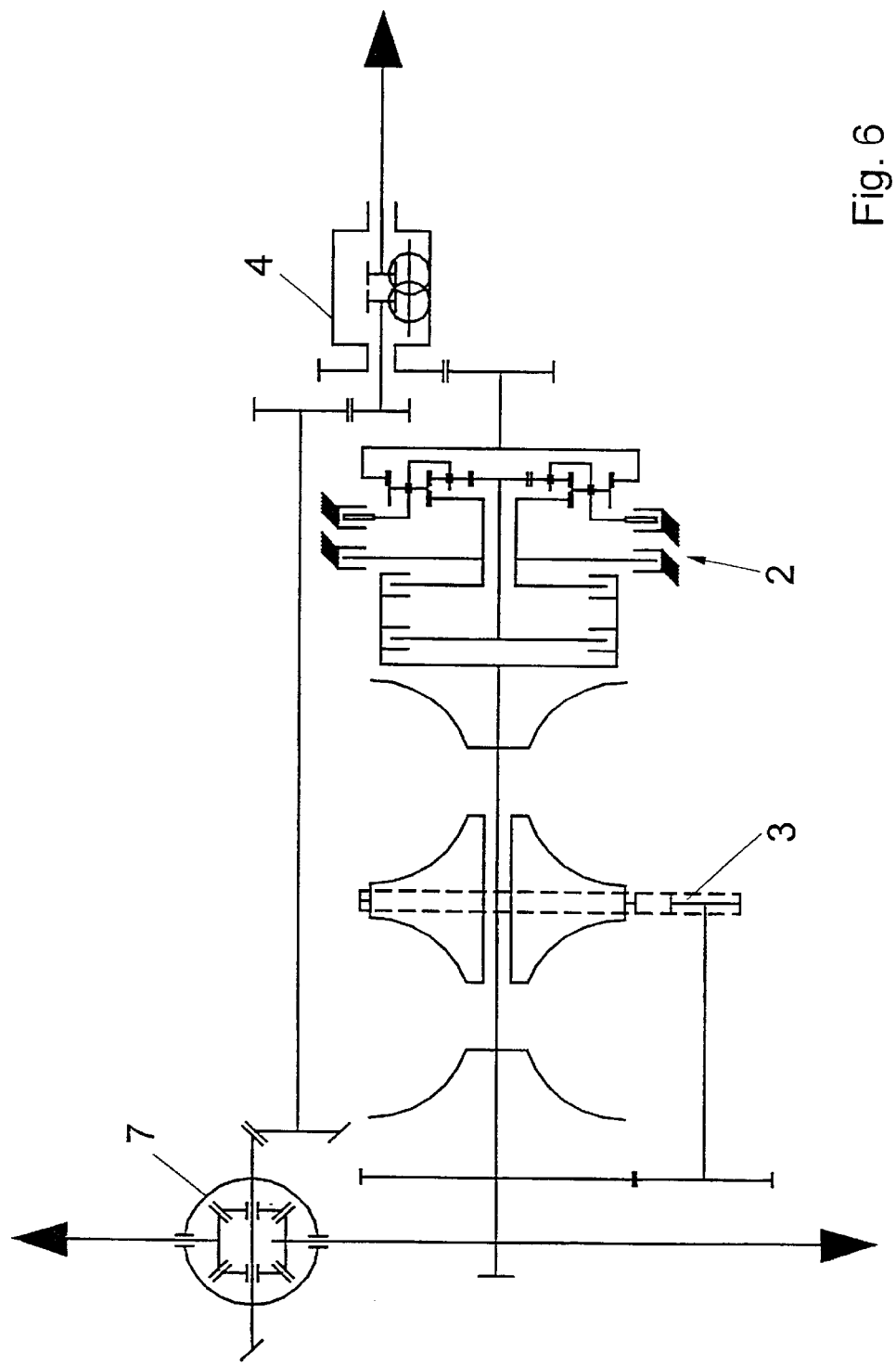

FIG. 6 shows a two-mode transmission unit without a power split device wherein the starting element is designed as a starting clutch, which exhibits a nested planetary gear set.

Figure 7:
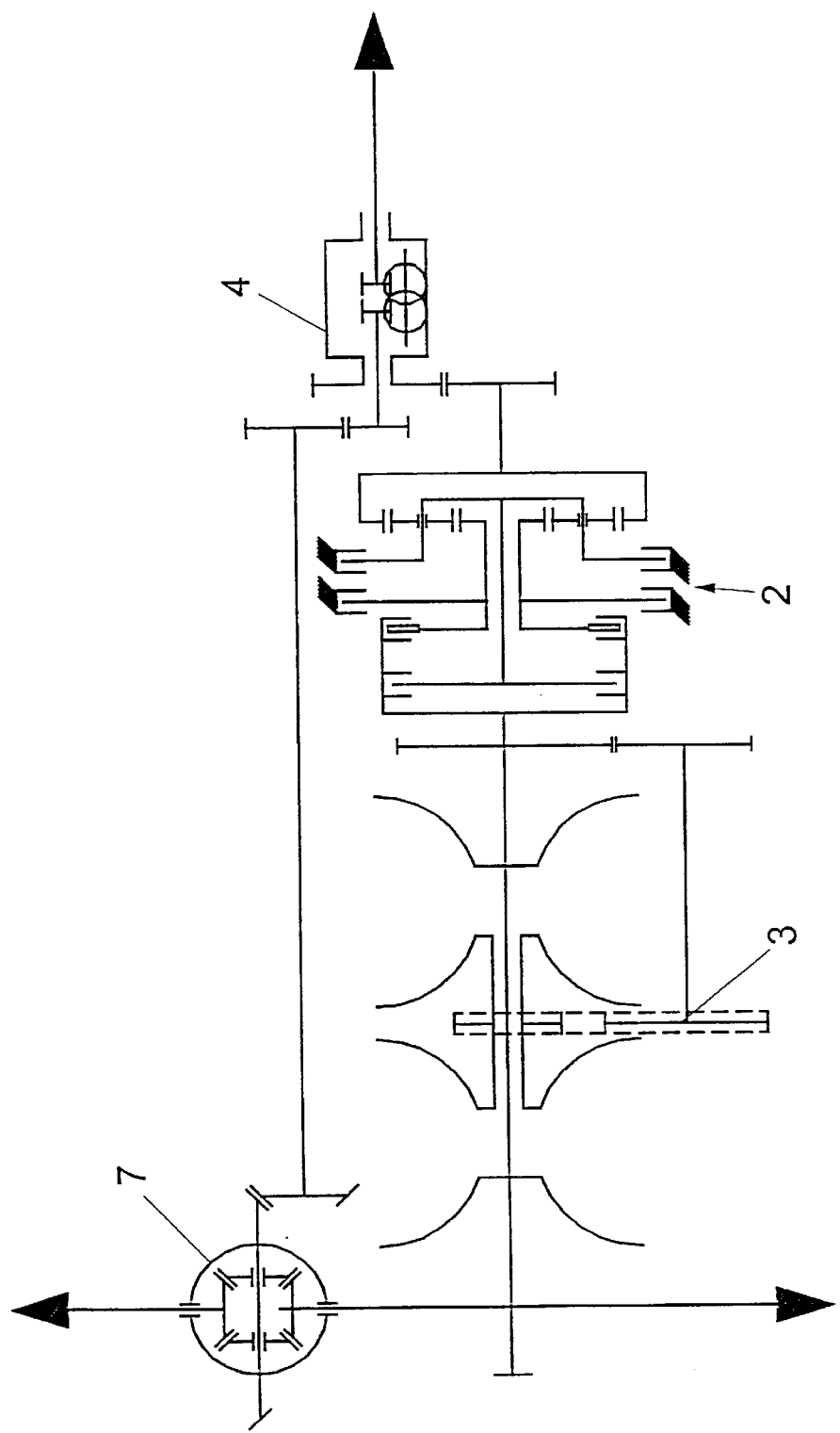

FIG. 7 shows a two mode transmission unit without a power split device whereby the starting element 2 is designed as an integrated starting clutch, which is provided with a single planetary gear set.

Figure 8:
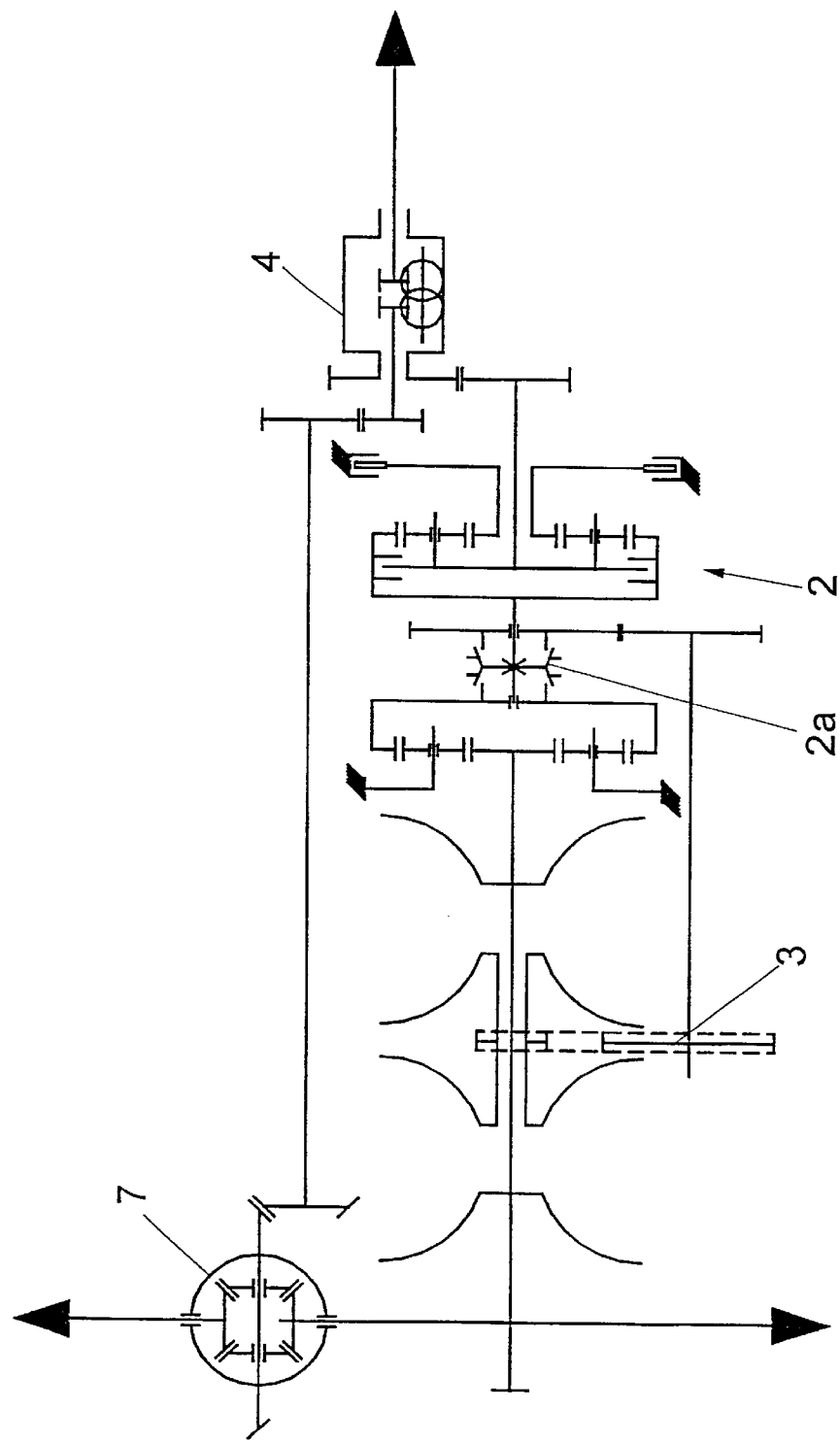

FIG. 8 shows a two mode transmission unit without a power split device in which the starting element 2 is constructed as an integrated starting clutch and wherein a shifting element is provided as a dog clutch 2a.

Figure 9:
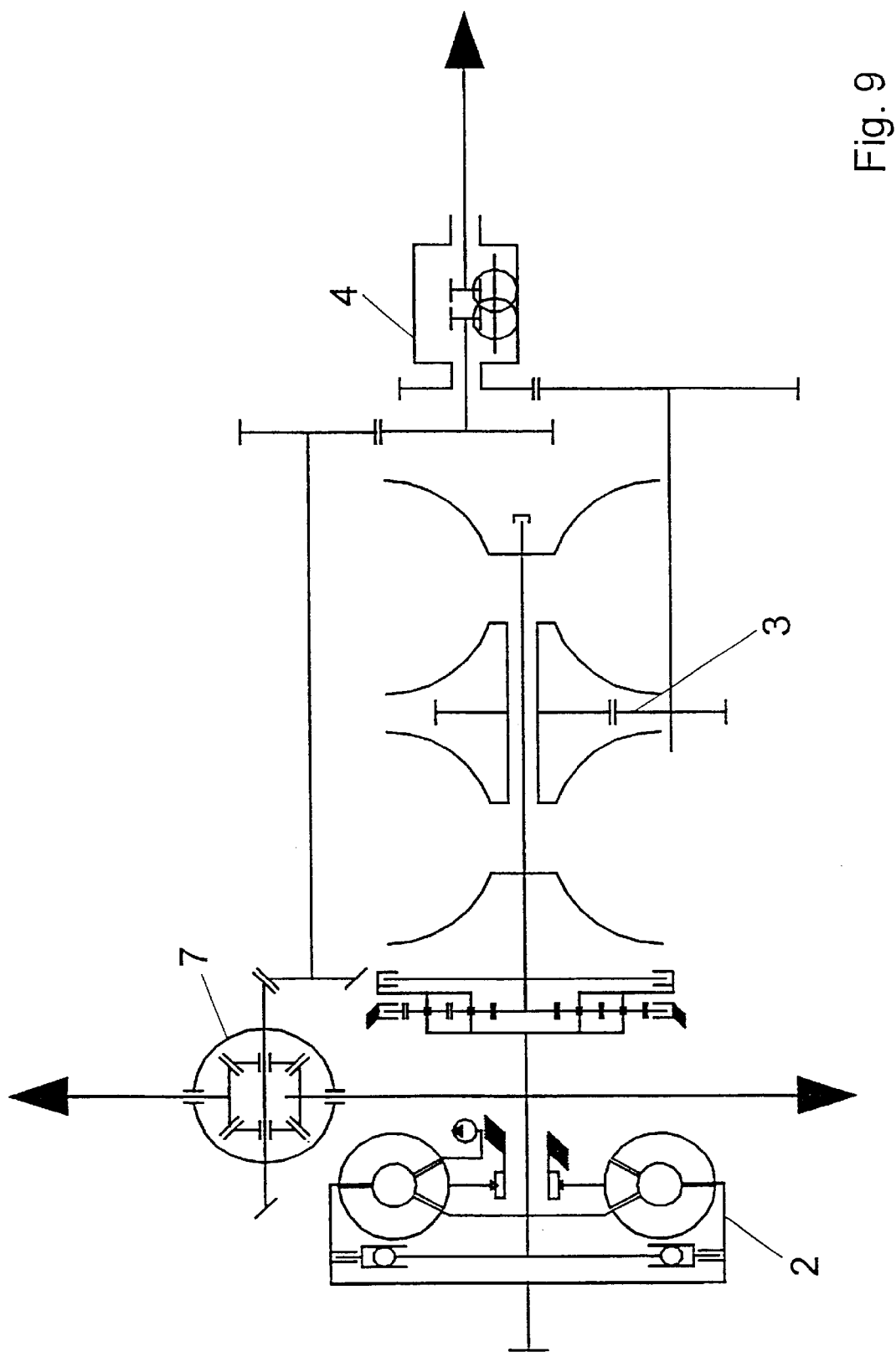

FIG. 9 shows a single mode transmission unit wherein the starting element 2 is designed as a hydrodynamic converter.

Figure 10:
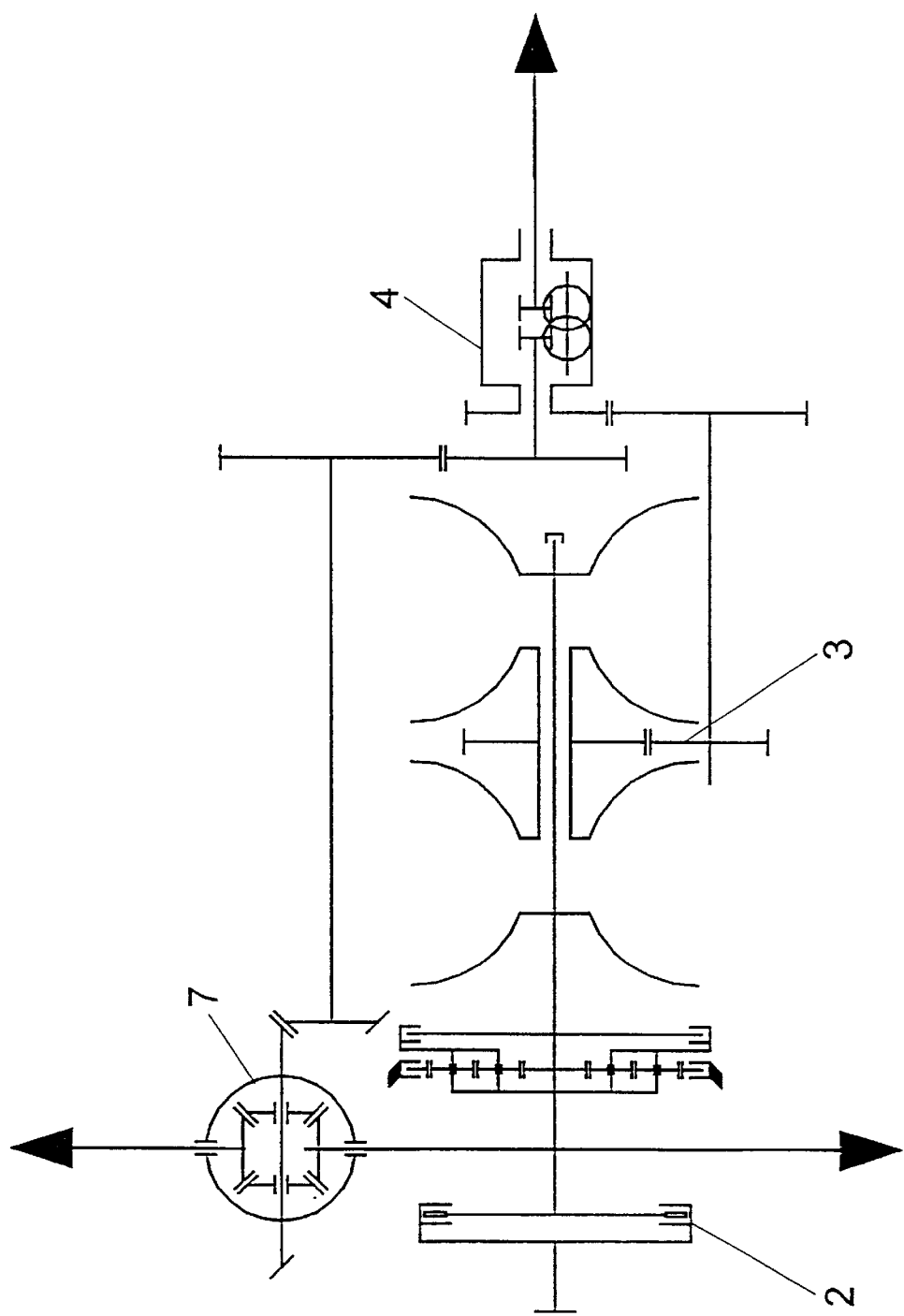

FIG. 10 shows a single mode transmission unit in which the starting element 2 is designed as a starting clutch.

Figure 11:
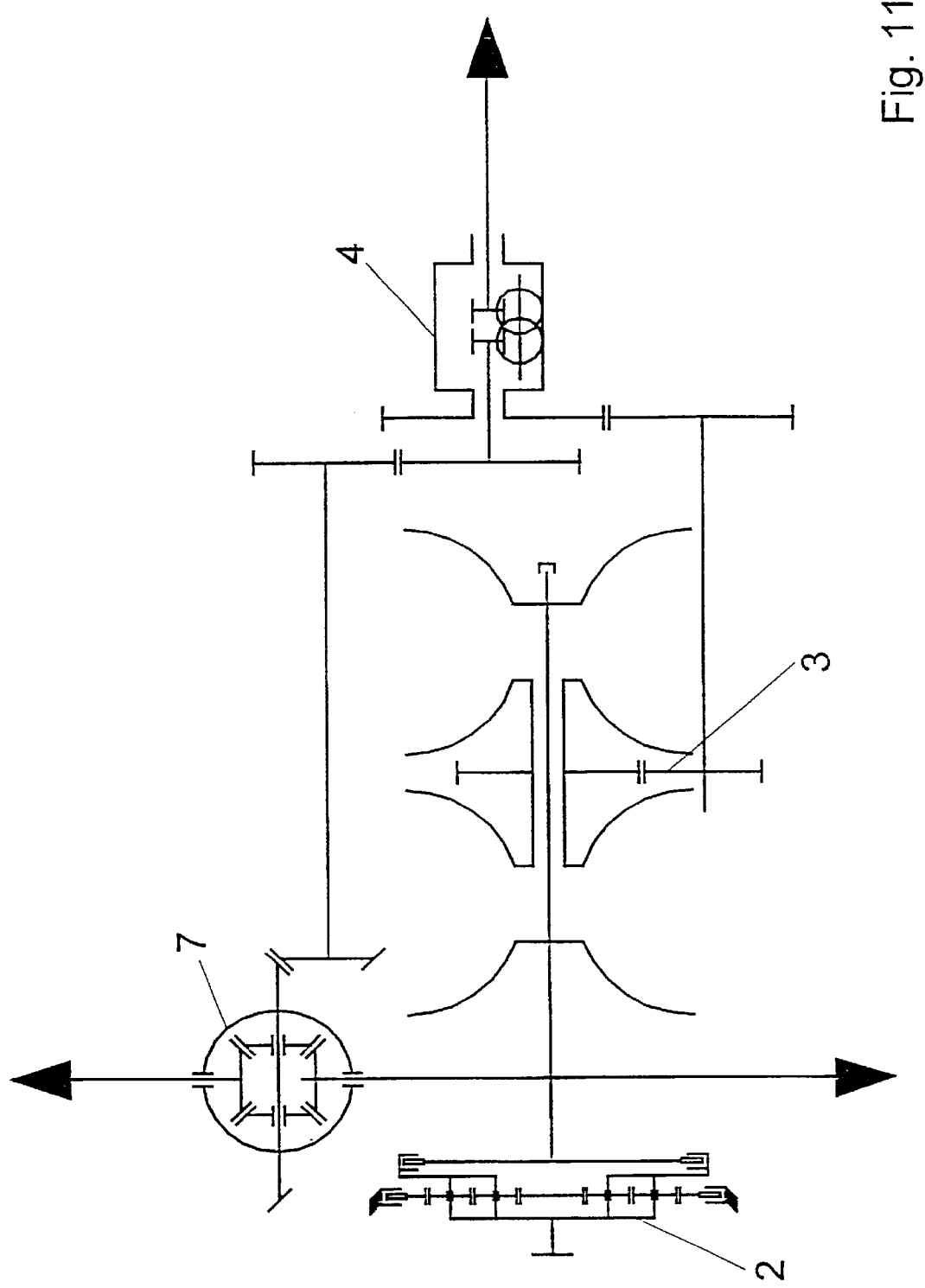

FIG. 11 shows a single mode transmission unit in which the starting element 2 is constructed as an integrated starting clutch.

Figure 12:
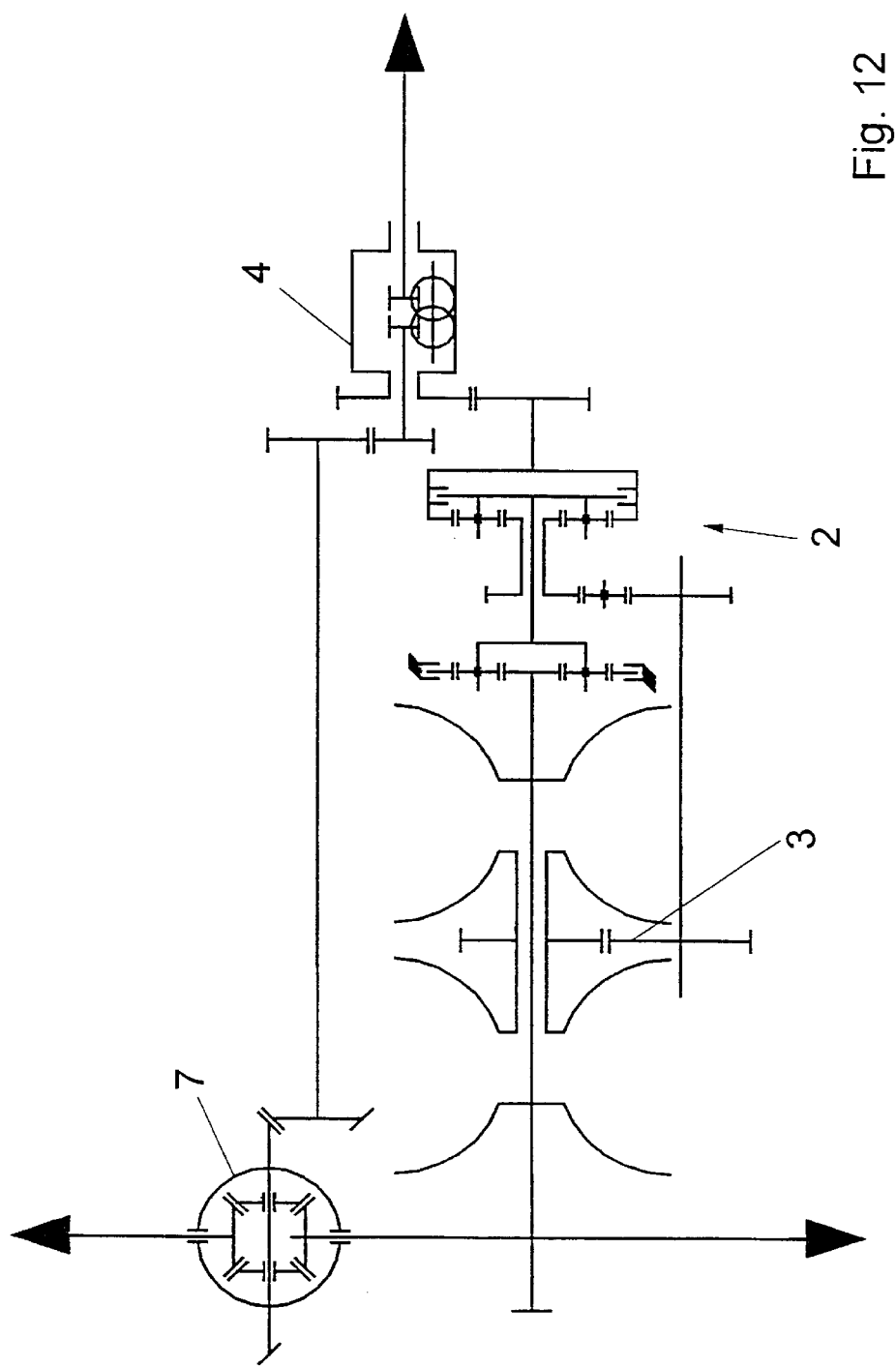

FIG. 12 shows a two mode transmission unit in which the starting element is made in the form of a "geared neutral transmission" with a corresponding number of clutches and a planetary gear set, so that idle running, forward travel, and backing up can be put into action by moving the variator.

Figure 13:
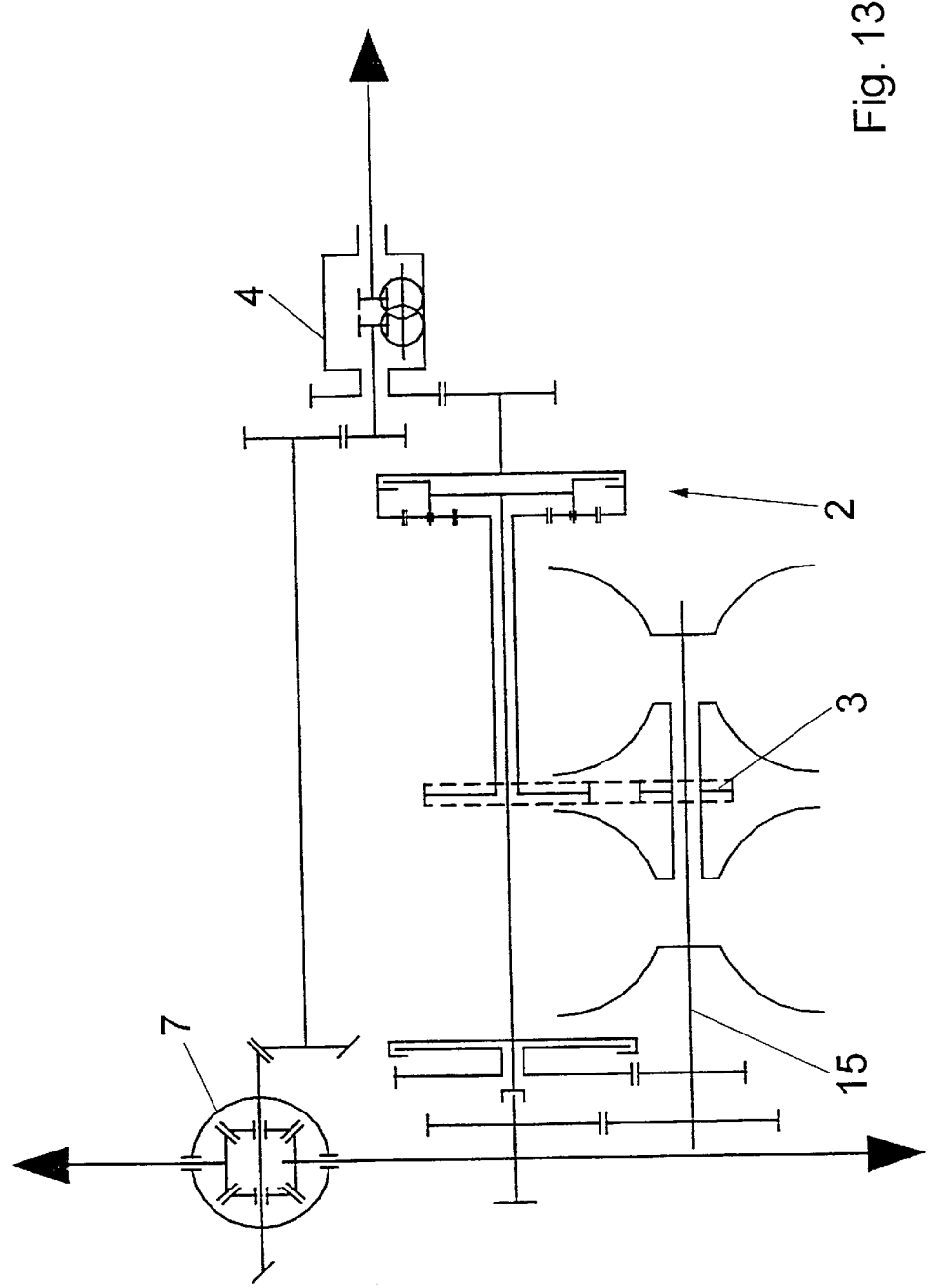

FIG. 13 shows a two mode transmission unit with a geared-neutral-gear set being used as a starting element wherein the friction disk transmission is placed on the countershaft 15.

Figure 14:
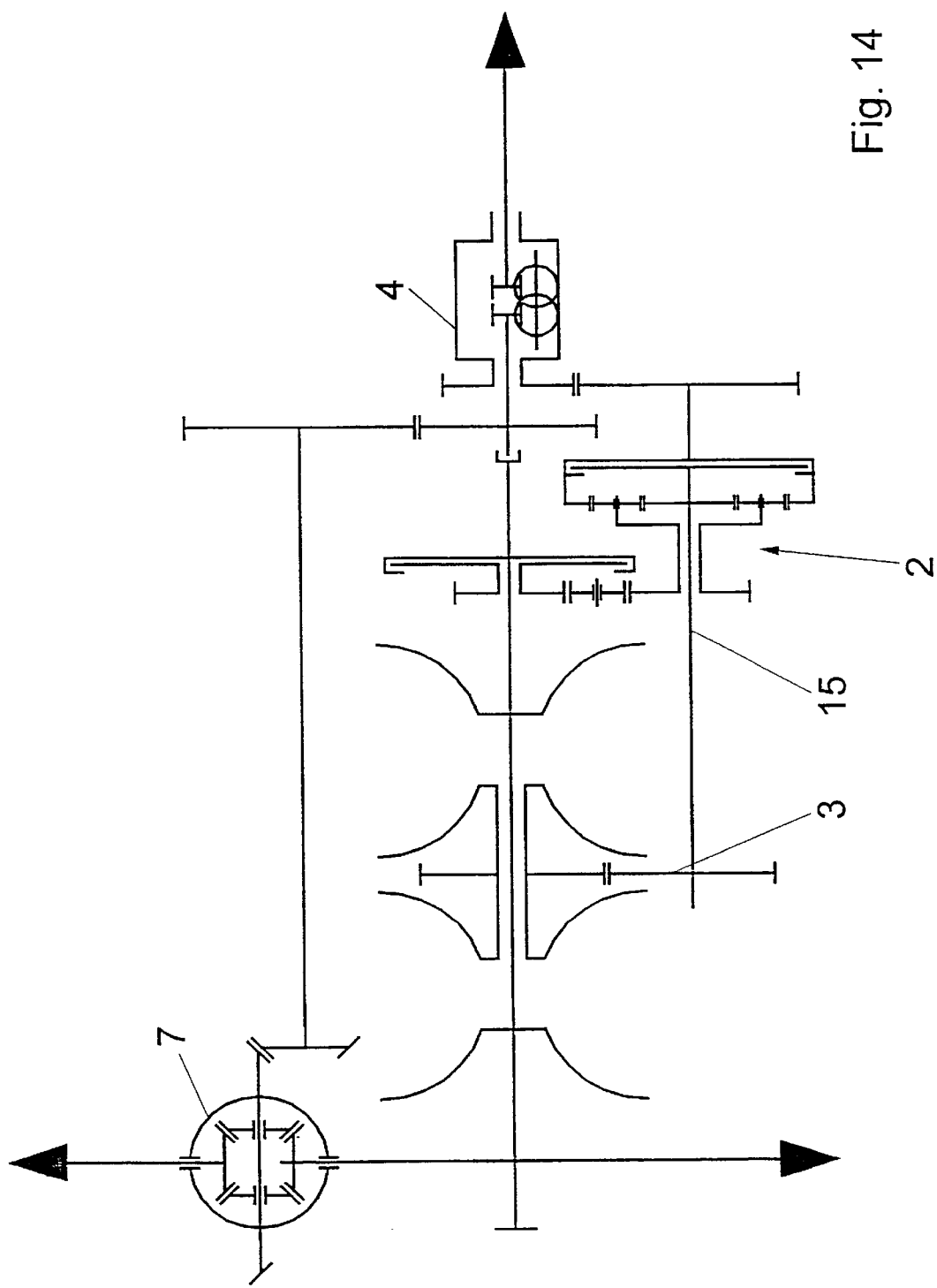

FIG. 14 shows a two mode transmission unit with a geared-neutral transmission wherein the planetary gear set which belongs thereto is placed upon the countershaft 15.

Figure 15:
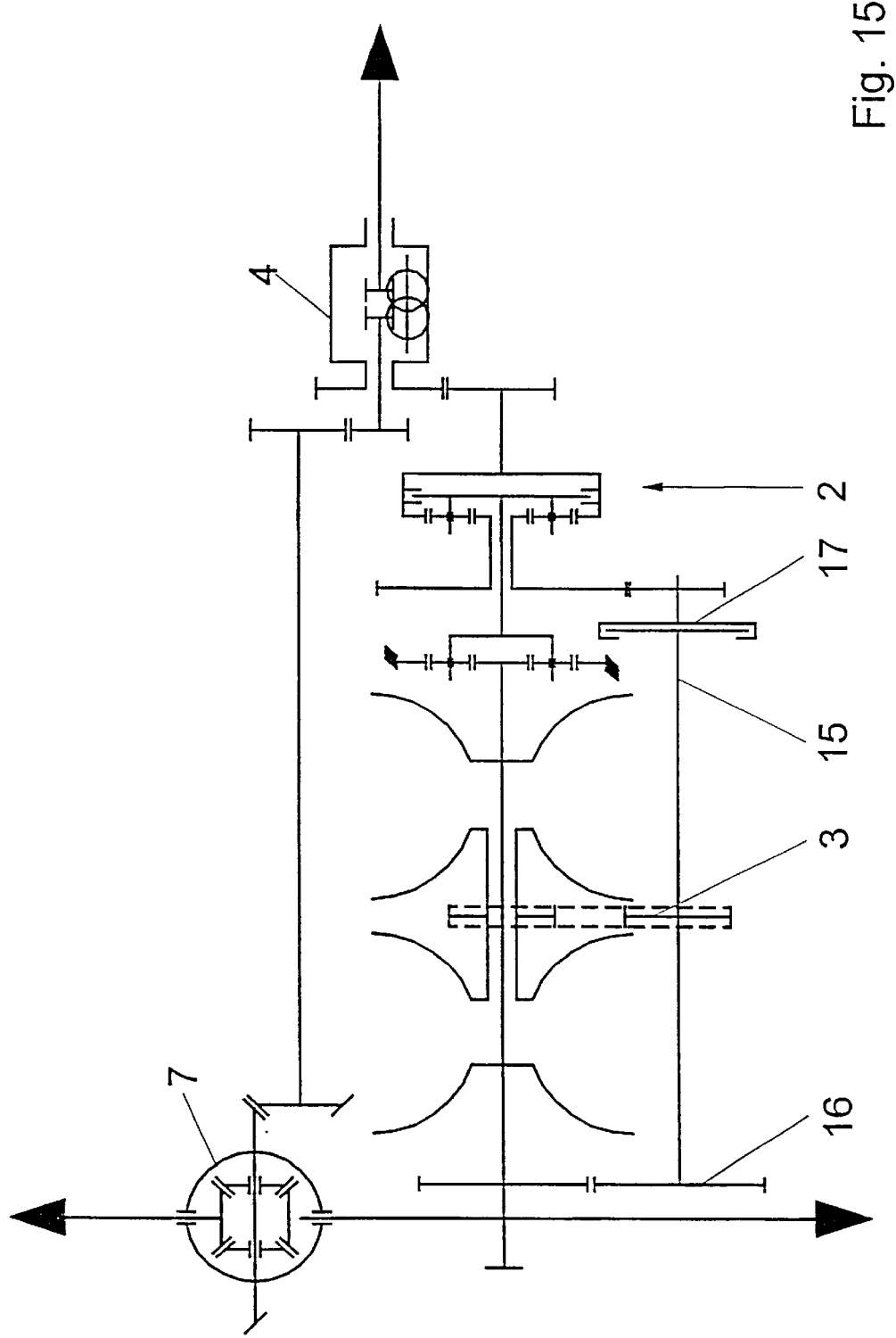

FIG. 15 shows a two mode transmission unit with a geared-neutral transmission serving as a starting element 2, which exhibits one spur gear 16 as well as a clutch 17 on the countershaft 15.

Figure 16:
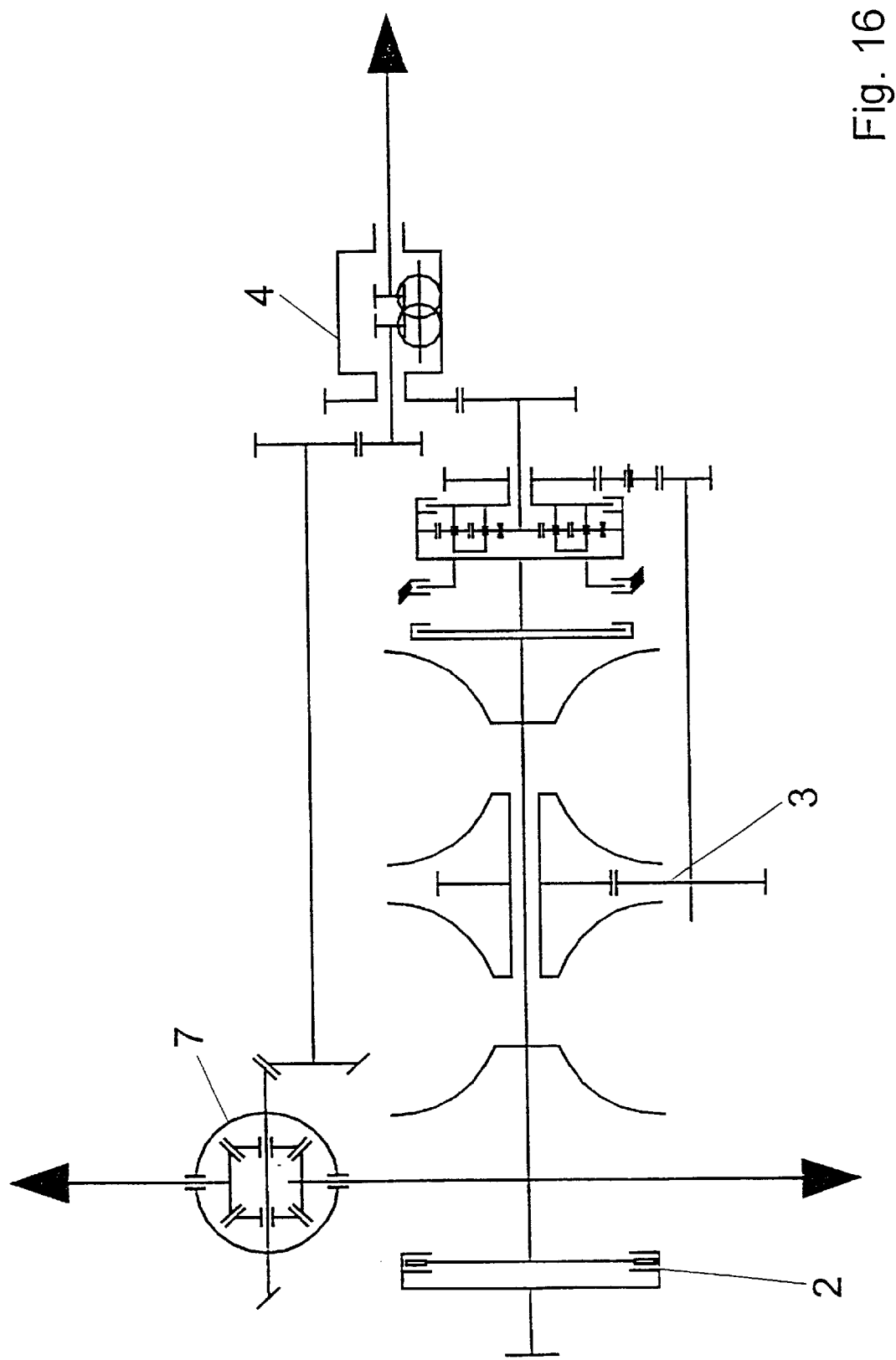

FIG. 16 shows a two mode transmission unit with a power split device with which the starting element 2 is designed as a starting clutch and as it is partially shown in the section of FIG. 2.

Figure 17:
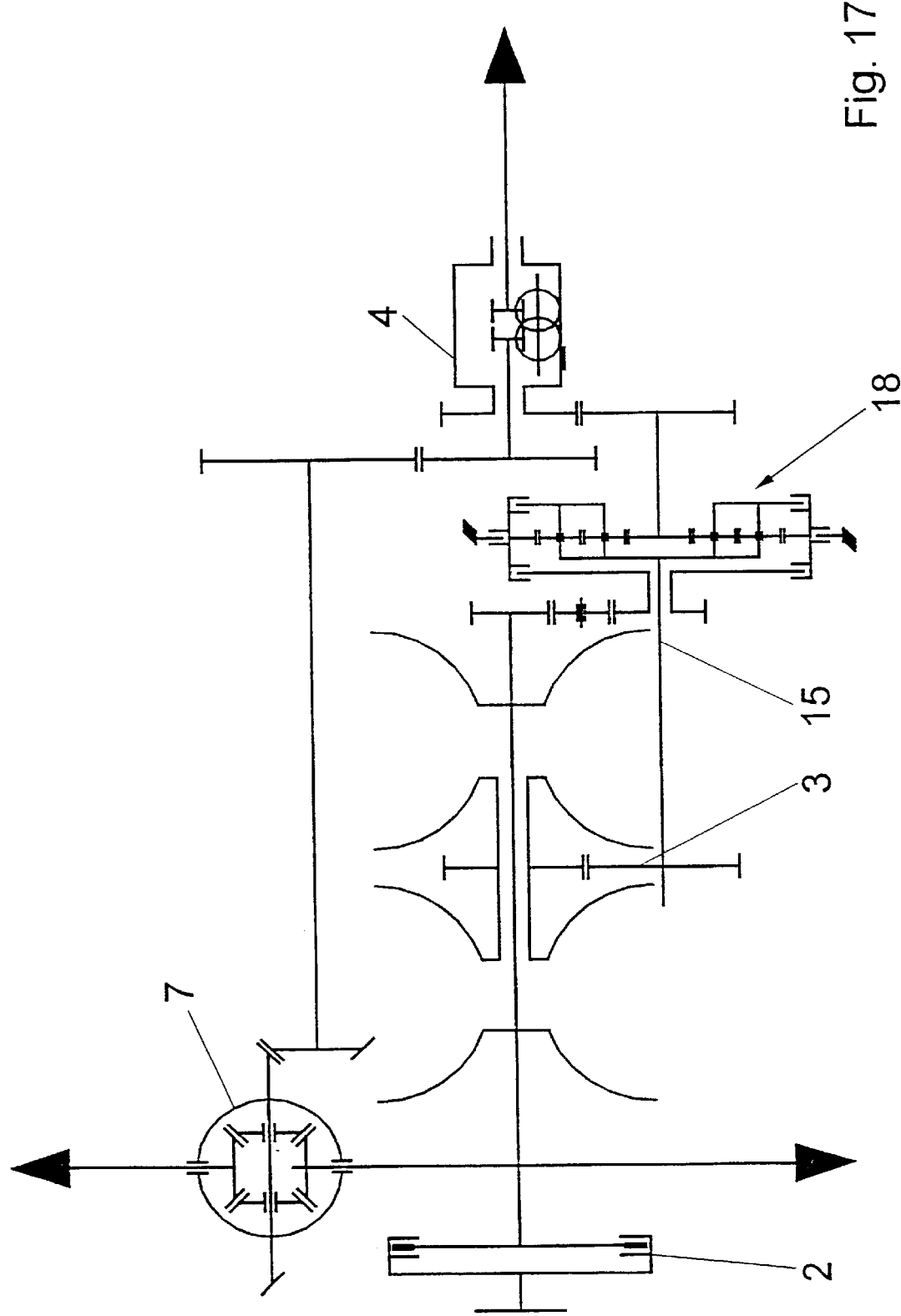

FIG. 17 shows a two mode transmission unit with power split device wherein on the countershaft 15 a planetary gear set 18 is placed.

Figure 18:
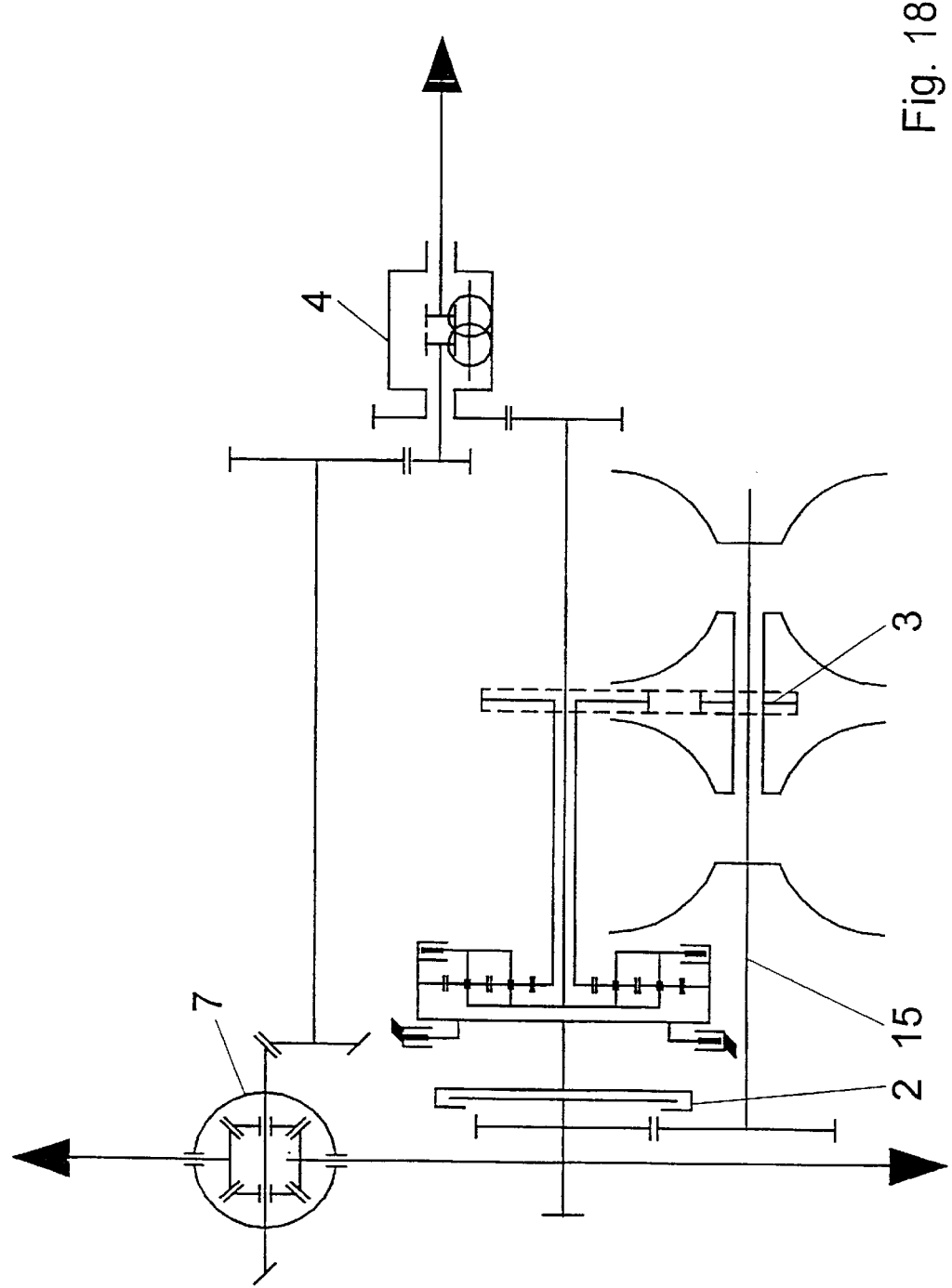

FIG. 18 shows a two mode transmission unit with power split device in which the starting element 2 is constructed as an integrated starting clutch and in the case of which the friction disk transmission 3 is placed on the countershaft 15.

Figure 19:
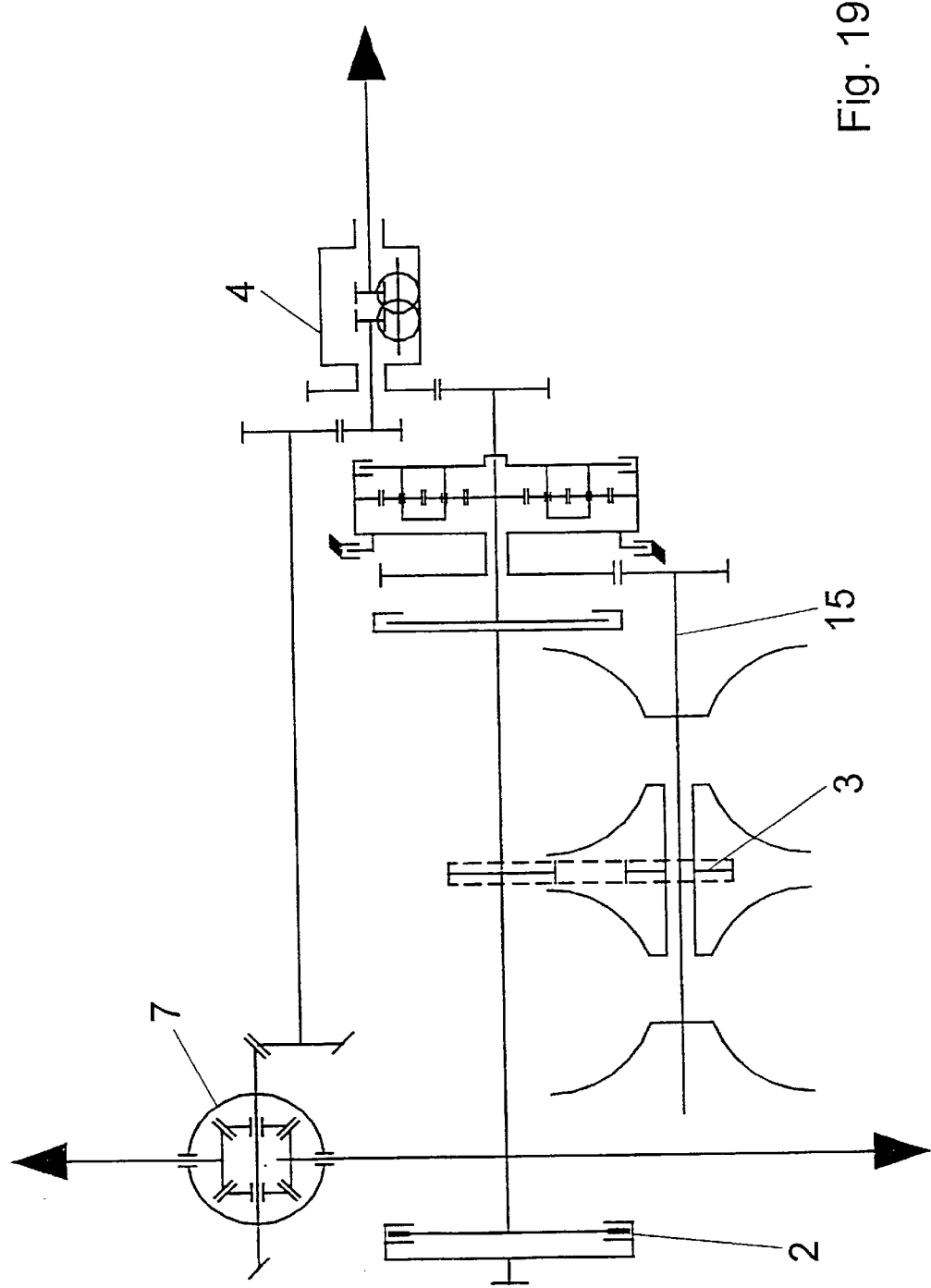

FIG. 19 shows a two mode transmission unit with power split in which the starting element 2 is designed as a starting clutch and in which the friction disk transmission 3 is placed on the countershaft 15.

Figure 20:
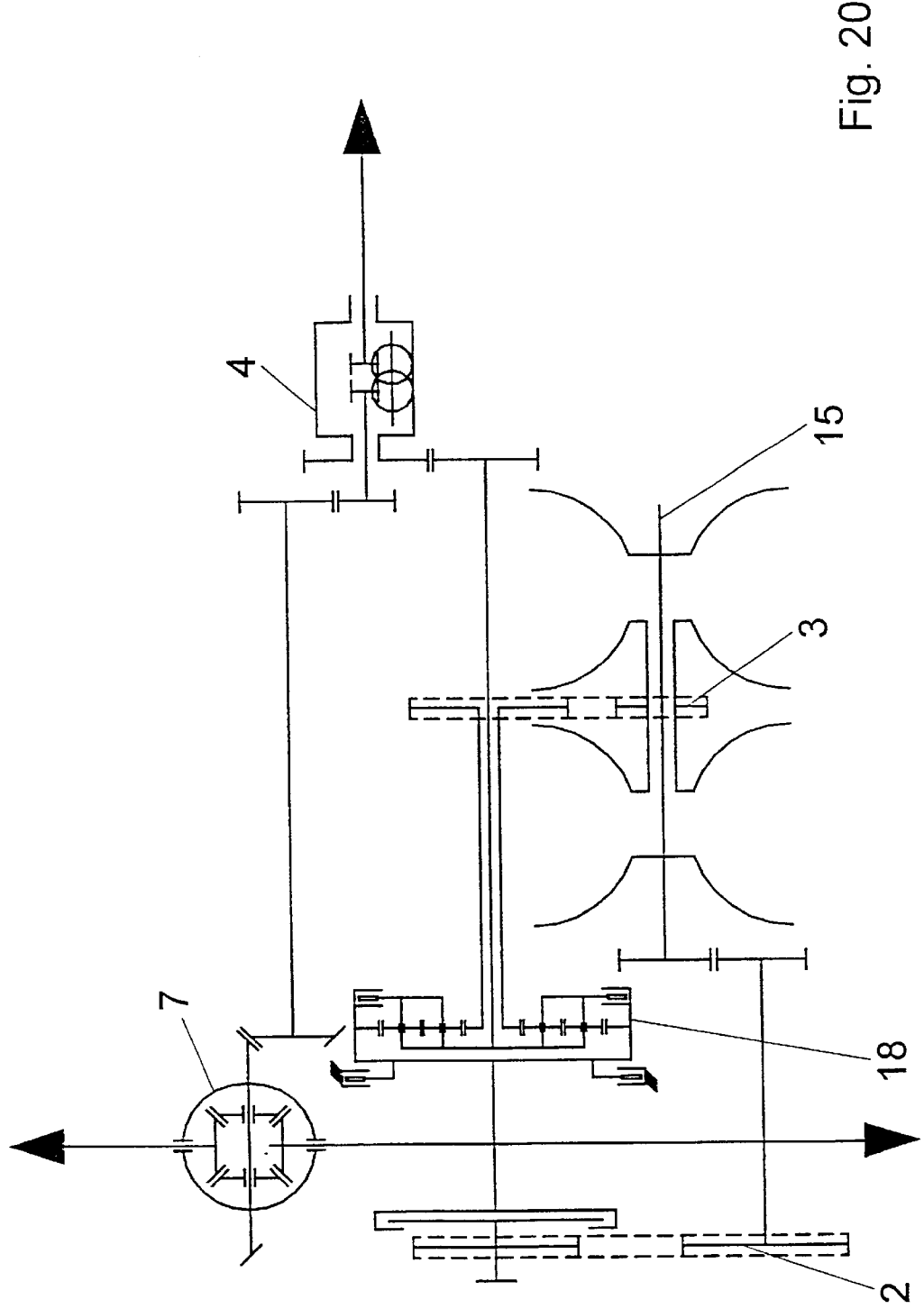

FIG. 20 shows a two mode transmission unit with power split in which the starting element 2 is built as an integrated starting clutch wherein the friction disk transmission 3 is placed on the countershaft 15 after the planetary gear set 18 and the thereto associated clutch.

Figure 21:
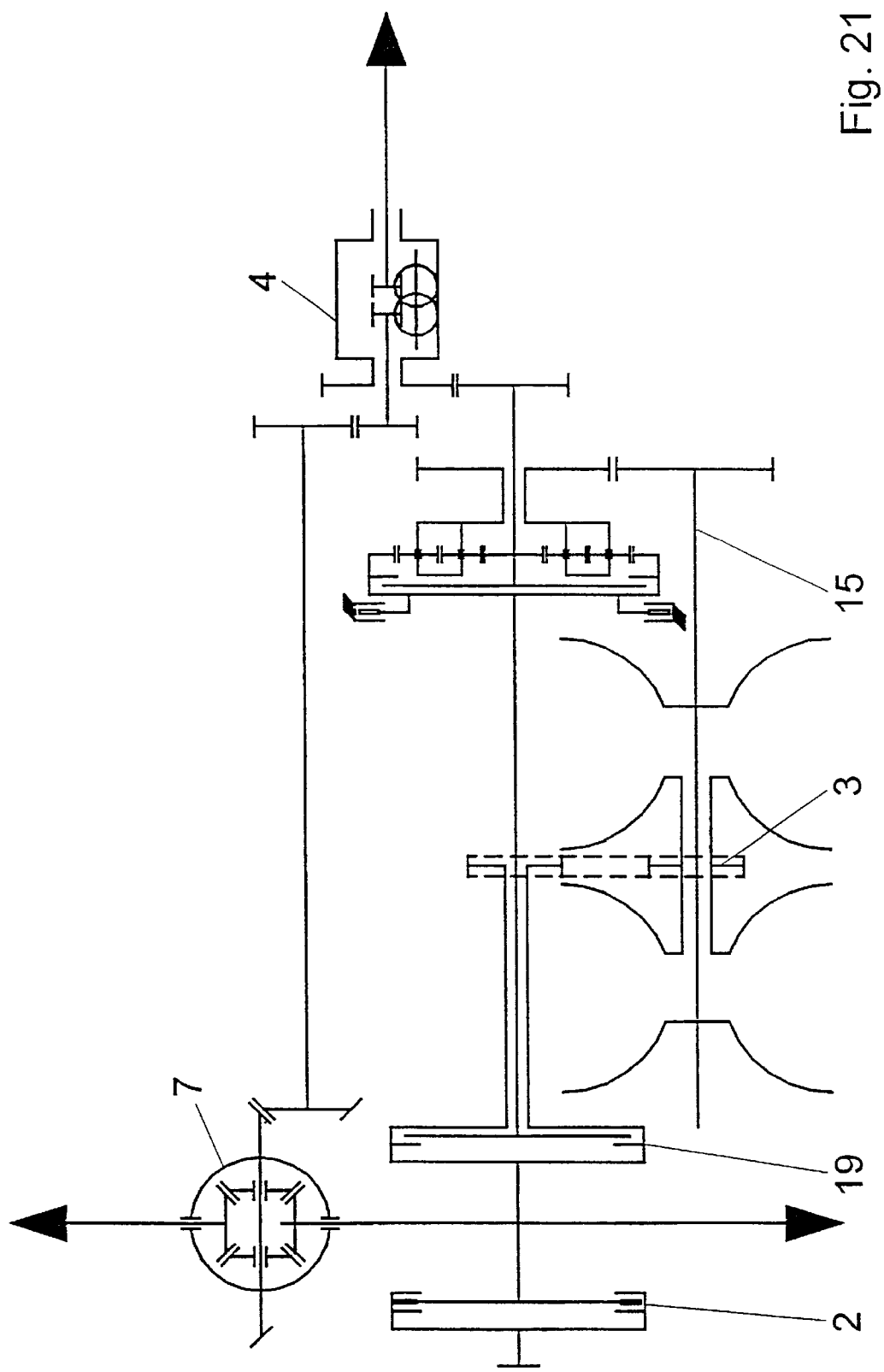

FIG. 21 shows a two mode transmission unit with power split in which the starting element 2 is designed as a starting clutch and a clutch 19 is provided between the starting clutch and the friction disk transmission 3.

Figure 22:
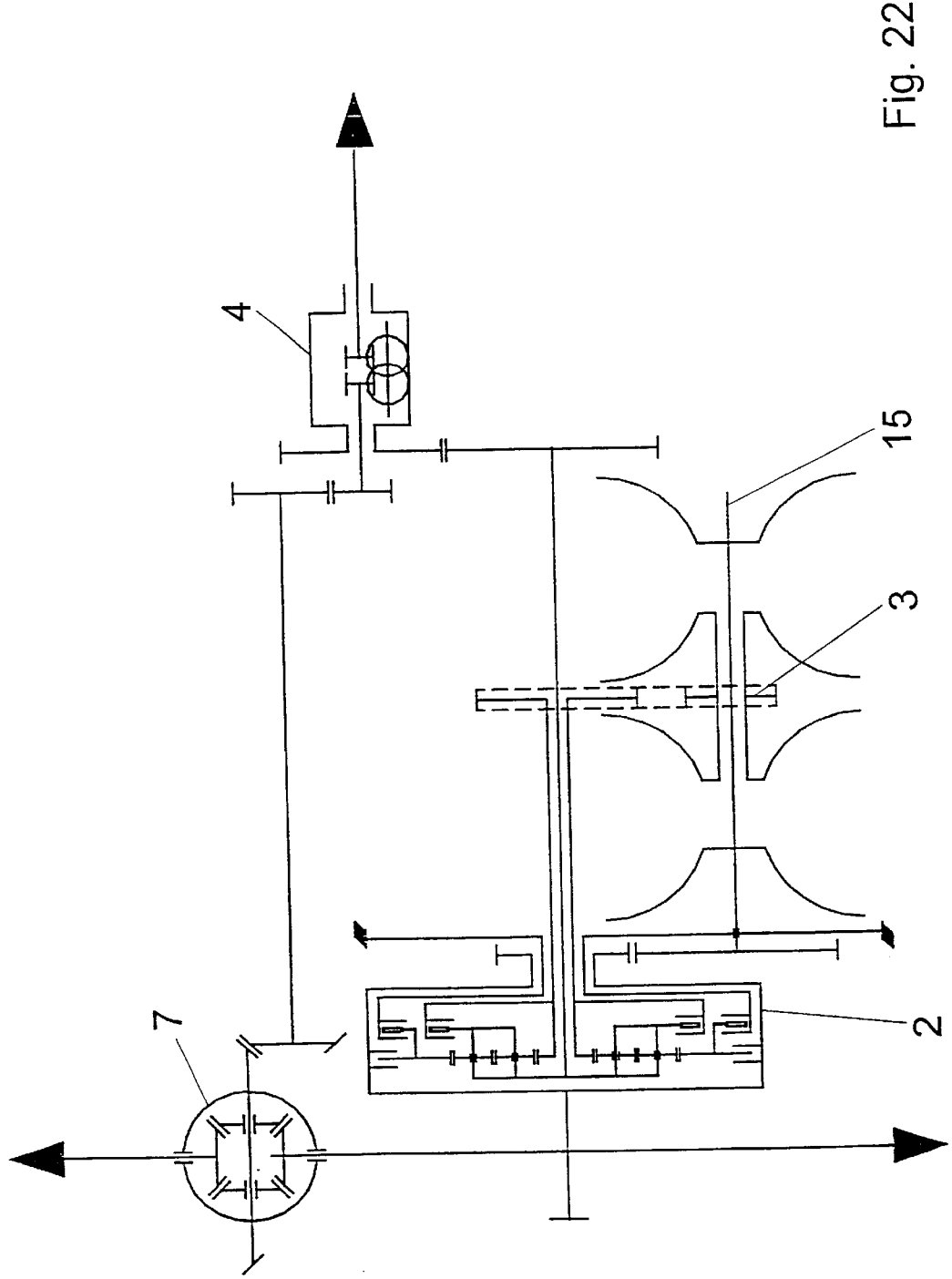

FIG. 22 shows a two mode transmission unit with power split and with an integrated starting clutch 2 which is set before the friction disk transmission 3 which, in turn, finds itself placed on the countershaft 15.

Figure 23:
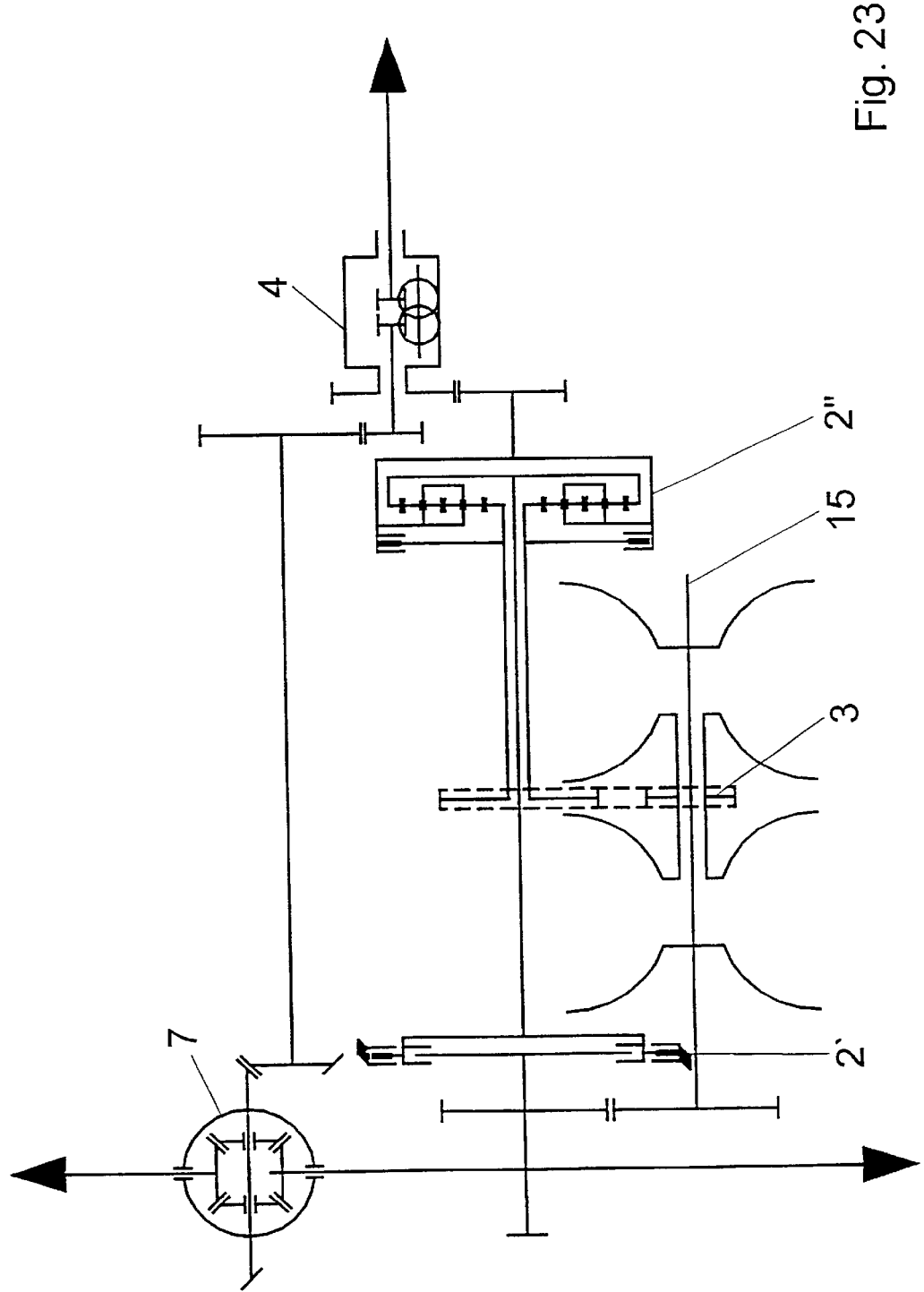

FIG. 23 shows a two mode transmission unit with power split in the case of which the friction disk transmission 3 is placed on the countershaft 15; the integrated starting clutch is, in this case, separated into two parts which are placed before and after the friction disk transmission 3.

What is claimed is:

1. A transmission unit for motor vehicles with a housing, an input drive shaft, first and second output drive shafts, and an arrangement for the variation of a gear ratio between the input drive shaft and the first and second output drive shafts, with the following arrangement within the housing:

the input drive shaft (1) is connected with a starting element (2);

the starting element (2) is joined to a stepless transmission (3);

the stepless transmission (3) is connected with a transfer gear (4);

the transfer gear (4) includes the first output shaft (5) which is connected with a rear axle drive and a second output shaft (6) which is connected to a differential (7) for a front axle drive; the differential (7) being installed in the motor vehicle to a side of a principal axis of the transmission and at least one of the two half-axles (9) penetrates the housing (8) ahead of the stepless transmission (3).

2. The transmission unit according to claim 1, wherein the stepless transmission (3) is a Continuous Variable Transmission (CVT).

3. The transmission unit according to claim 1, wherein the stepless transmission (3) is a friction disk transmission with two transmission units, the output disks of which exert load on a common drive shaft.

4. The transmission unit according to claim 1, wherein the transfer gear assembly (4) possesses a mid-differential for apportioning torque to a rear axle and a front axle.

5. The transmission unit according to claim 2, wherein the transmission unit is a two-mode transmission without power splitting and the starting element (2) is a hydrodynamic converter.

6. The transmission unit according to claim 2, wherein the transmission unit is a two-mode transmission without power splitting and the startup element (2) is a starting clutch.

7. The transmission unit according to claim 6, wherein the starting clutch (2) is provided with a torsion damper (10) as well as an oil supply unit (11), with a motor-side oil feed (12) in the form of a canalized plate and with a transmission-side oil pump (13) in the form of an internal gear pump.

8. The transmission unit according to claim 2, wherein the transmission unit is a two-mode transmission without power split and the starting element (2) is an integrated starting clutch which is located between the stepless transmission (3) and the transfer gear (4).

9. The transmission unit according to claim 8, wherein the transmission unit possesses an integrated starting clutch and two individual planetary gear sets.

10. The transmission unit according to claim 8, wherein the transmission unit possesses an integrated starting clutch and a single planetary gear set.

11. The transmission unit according to claim 8, wherein the transmission unit possesses an integrated starting clutch and a nested planetary gear set.

12. The transmission unit according to claim 8, wherein the transmission unit possesses an integrated starting clutch and a dog clutch (2a) as a shifting element.

13. The transmission unit according to claim 2, wherein the transmission unit is a single mode transmission unit and the starting element (2) is a hydrodynamic converter.

14. The transmission unit according to claim 2, wherein the transmission unit is a single mode transmission unit and the starting element (2) is a starting clutch.

15. The transmission unit according to claim 2, wherein the transmission unit is a single mode transmission unit and the starting element (2) is an integrated starting clutch.

16. The transmission unit according to claim 2, wherein the transmission unit is a two mode transmission unit and that the starting element (2) is a geared neutral transmission, which is disposed between the stepless transmission (3) and the transfer gear (4).

17. The transmission unit according to claim 16, wherein the stepless transmission (3) is placed on a counter shaft (15) which is aligned parallel to the input drive shaft (1).

18. The transmission unit according to claim 16, wherein the geared neutral transmission is placed with the corresponding planetary gear sets on a counter shaft (15) which is aligned parallel to the input drive shaft (1).

19. The transmission unit according to claim 16, wherein the geared neutral transmission possesses a spur gear (16) and a clutch (17), which are both located on a counter shaft (15) which is aligned parallel to the input drive shaft (1).

20. The transmission unit according to claim 2, wherein the transmission unit is a two mode transmission unit with power split and the starting element (2) is a hydrodynamic converter.

21. The transmission unit according to claim 2, wherein the transmission unit is a two mode transmission unit with power split and the starting element (2) is a starting clutch.

22. The transmission unit according to claim 21, wherein the transmission unit possesses a planetary gear drive, which is placed on a counter shaft (15) aligned parallel to the input drive shaft (1).

23. The transmission unit according to claim 2, wherein the transmission unit is a two mode transmission unit with power split and the starting element (2) is an integrated starting clutch.

24. The transmission unit according to claim 23, wherein the stepless transmission (3) is located on a counter shaft (15) which is aligned parallel to the input drive shaft (1).

25. The transmission unit according to claim 21, wherein the stepless transmission (3) is placed on a counter shaft (15) which is aligned parallel to the input drive shaft (1).

26. The transmission unit according to claim 24, wherein the planetary drive and the associated clutches of the integrated starting clutch are placed between the two half-axles (9) of the differential (7) for the front wheels and the stepless transmission (3).

27. The transmission unit according to claim 25, wherein the starting clutch is located before the stepless transmission (3).

28. The transmission unit according to claim 25, wherein the starting clutch is separated in two parts, whereby a part (2') is located before the stepless transmission (3) and a part (2") after the said stepless transmission.

* * * * *